(12) United States Patent
Caspi et al.

(10) Patent No.: US 7,248,684 B2
(45) Date of Patent: Jul. 24, 2007

(54) SYSTEM AND METHOD FOR PROCESSING CONFERENCE COLLABORATION RECORDS

(75) Inventors: Rami Caspi, Sunnyvale, CA (US); William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 527 days.

(21) Appl. No.: 10/316,514

(22) Filed: Dec. 11, 2002

(65) Prior Publication Data

US 2004/0114746 A1    Jun. 17, 2004

(51) Int. Cl.
*H04M 3/42* (2006.01)
(52) U.S. Cl. .............................. 379/202.01; 379/93.21; 379/203.01
(58) Field of Classification Search ........... 379/202.01, 379/203.01, 204.01, 88.13, 93.01, 201.01
See application file for complete search history.

(56) References Cited

U.S. PATENT DOCUMENTS

| | | | |
|---|---|---|---|
| 5,422,937 A | 6/1995 | Ferrara | 379/67.1 |
| 5,526,407 A * | 6/1996 | Russell et al. | 379/88.01 |
| 5,533,110 A | 7/1996 | Pinard et al. | 379/355.01 |
| 5,987,376 A | 11/1999 | Olson et al. | 701/201 |
| 6,167,395 A | 12/2000 | Beck et al. | 707/3 |
| 6,252,952 B1 | 6/2001 | Kung et al. | 379/114.1 |
| 6,346,952 B1 | 2/2002 | Shtivelman | 715/758 |
| 6,389,124 B1 | 5/2002 | Schnarel et al. | 379/142.01 |
| 6,393,460 B1 | 5/2002 | Gruen et al. | 709/204 |
| 6,560,222 B1 | 5/2003 | Pounds et al. | 370/353 |
| 6,658,095 B1 | 12/2003 | Yoakum et al. | 379/93.01 |
| 6,757,722 B2 | 6/2004 | Lonnfors et al. | 709/220 |
| 6,804,659 B1 * | 10/2004 | Graham et al. | 705/14 |
| 6,970,547 B2 | 11/2005 | Andrews et al. | 379/210.01 |
| 2004/0059781 A1 | 3/2004 | Yoakum et al. | 709/204 |
| 2004/0062383 A1 | 4/2004 | Sylvain | 379/265.06 |
| 2004/0114541 A1 | 6/2004 | Caspi et al. | 370/260 |
| 2004/0122901 A1 | 6/2004 | Sylvain | 709/206 |
| 2004/0125941 A1 | 7/2004 | Yoakum | 379/266.02 |
| 2004/0246331 A1 | 12/2004 | Caspi et al. | 348/14.08 |
| 2004/0249884 A1 | 12/2004 | Caspi et al. | 709/204 |

\* cited by examiner

*Primary Examiner*—Ovidio Escalante

(57) ABSTRACT

A telecommunications system includes a network (102) and a multimedia server (104) operably coupled to the network. The multimedia server (104) is adapted to manage a multimedia conference and includes a memory (103) for storing selectable portions of the multimedia conference. The system further includes one or more client devices (122) operably coupled to the network and adapted to set recording cues for choosing portions of said multimedia conference for playback. The multimedia server or clients may include a voice recognition system (216) for transcribing audio portions of the conference. The voice recognition system may further be used to detect instances of the recording cues. In addition, in certain embodiments, the system provides for a moderator or participants to the conference an ability to adjust relevance probabilities generated upon recognition of the cues.

26 Claims, 14 Drawing Sheets

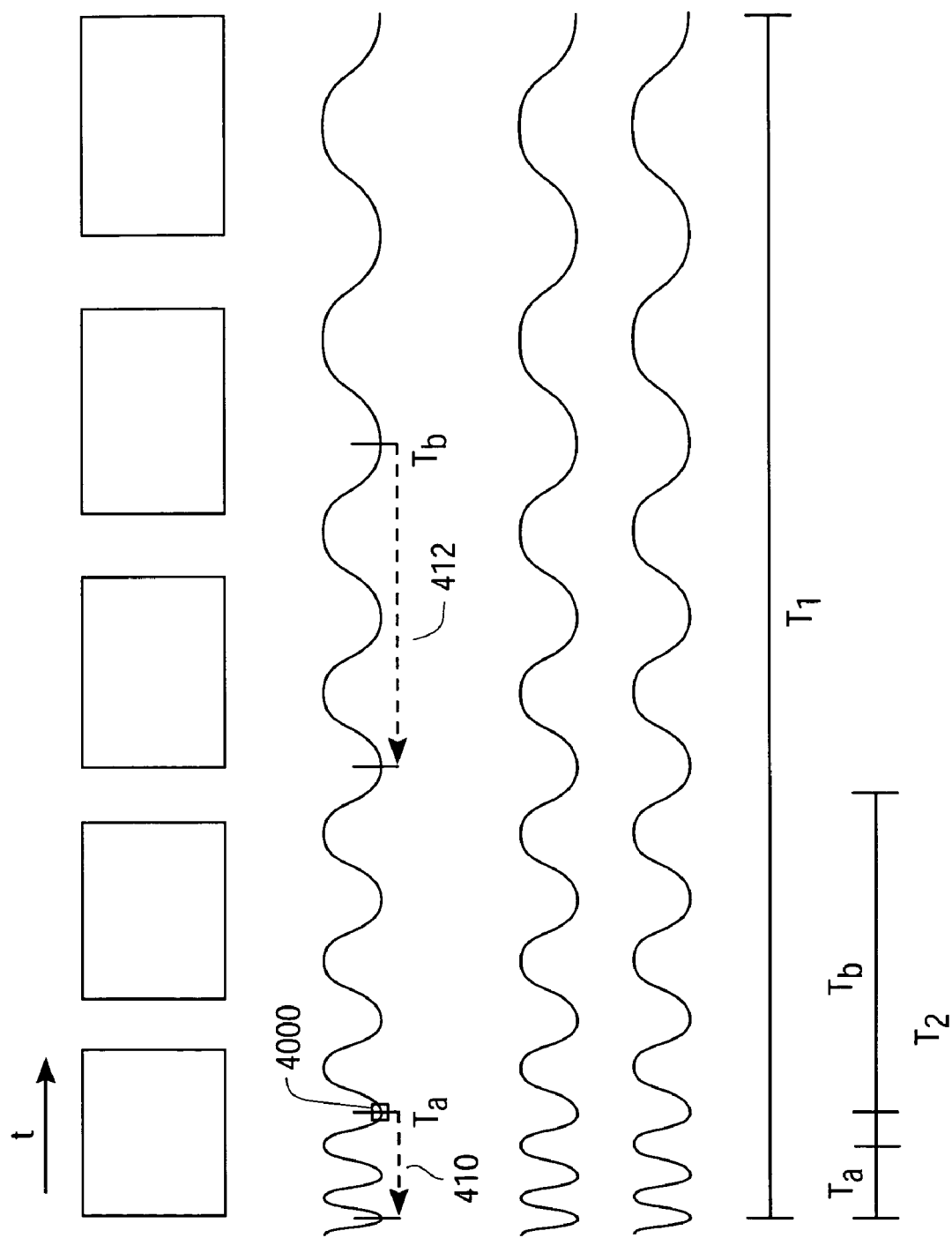

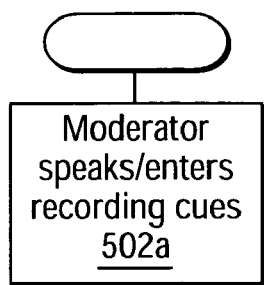
FIG. 5A
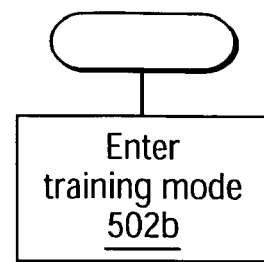
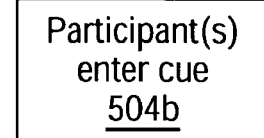
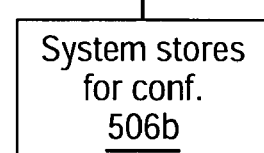
FIG. 5B
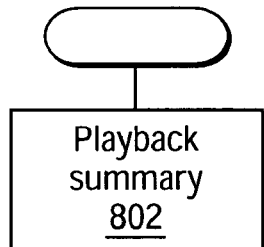
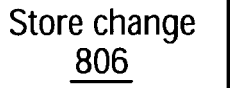
FIG. 8

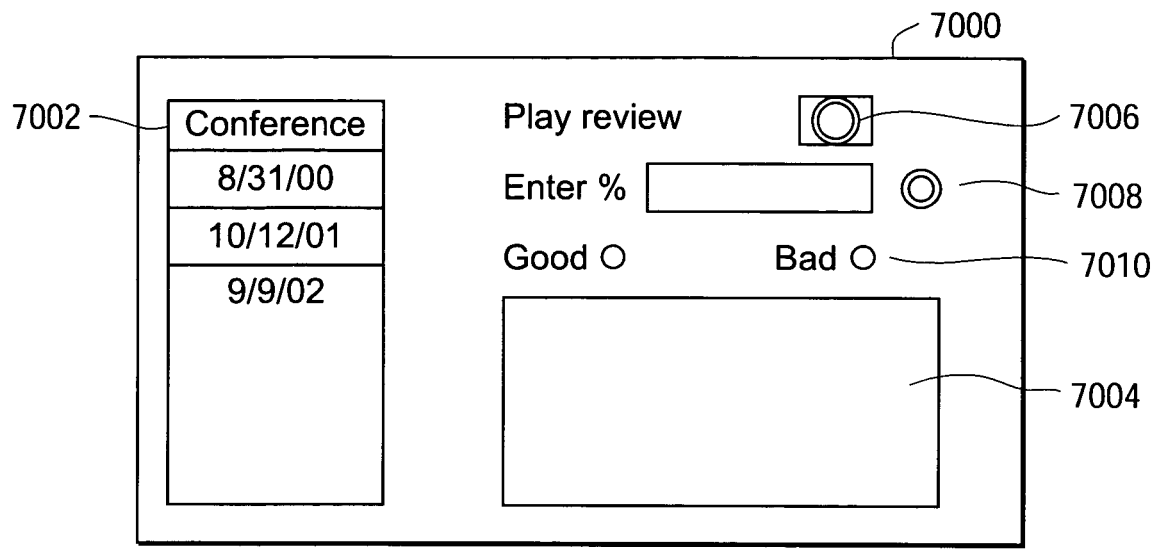
FIG. 7B
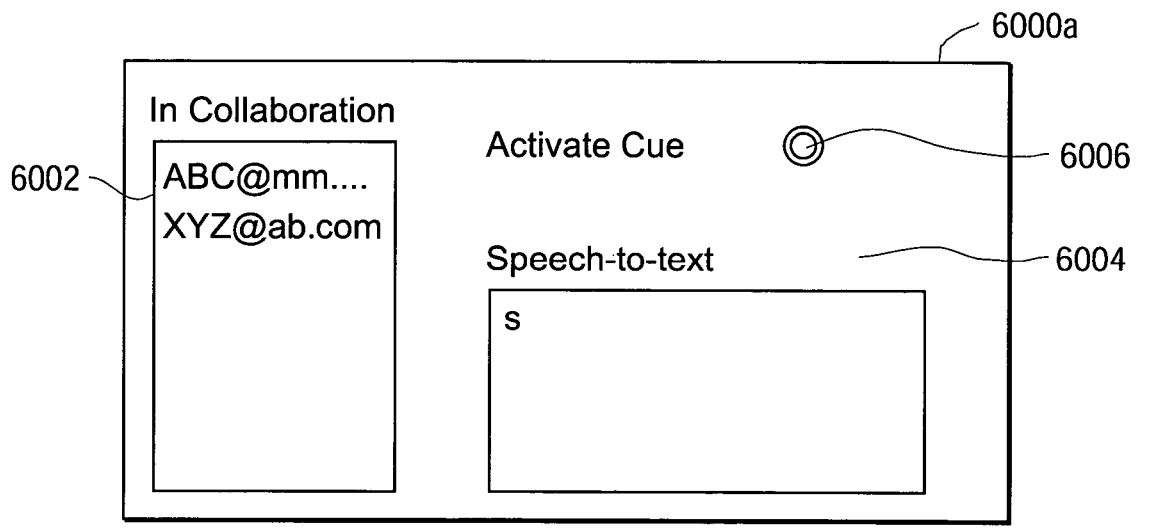
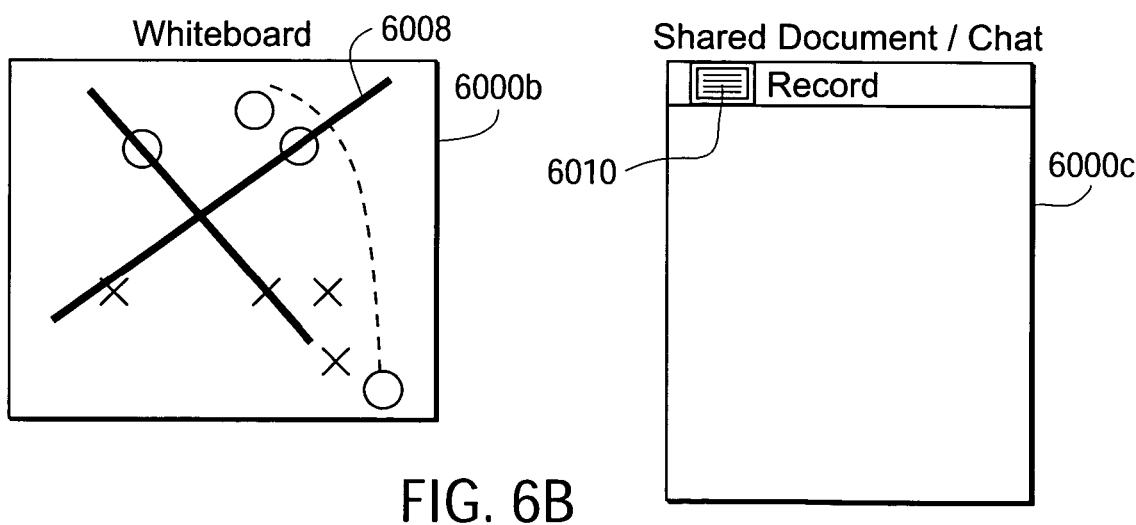
FIG. 6B

SYSTEM AND METHOD FOR PROCESSING CONFERENCE COLLABORATION RECORDS

FIELD OF THE INVENTION

The present invention relates to telecommunications systems and, in particular, to an improved system and method for messaging collaboration summarization.

BACKGROUND OF THE INVENTION

The development of various voice over IP protocols such as the H.323 Recommendation and the Session Initiation Protocol (SIP) has led to increased interest in multimedia conferencing. In such conferencing, typically, a more or less central server manages the conference and maintains the various communications paths. Parties to the conference are able to communicate via voice and/or video through the server.

Instant messaging can provide an added dimension to multimedia conferences. In addition to allowing text chatting, instant messaging systems such as Microsoft Windows Messenger can allow for transfer of files, document sharing and collaboration, collaborative whiteboarding, and even voice and video.

As can be appreciated, a complete multimedia conference can involve multiple voice and video streams, the transfer of many files, and much marking-up of documents and whiteboarding. On occasion, an individual who is not a party to all or part of the conference may nevertheless find it necessary to review what was said. While a messaging server or individual clients may be able to record or store an entirety of such a conference, the reviewing party may not wish to replay the entire meeting, including all the irrelevant comments and dead ends typical in any multiparty collaboration.

As such, there is a need for a system and method for easily reviewing a multimedia conference. There is a further need for a system and method for accessing particular portions of a multimedia conference upon review.

SUMMARY OF THE INVENTION

These and other drawbacks in the prior art are overcome in large part by a system and method according to embodiments of the present invention.

A telecommunications system according to an embodiment of the present invention includes a network and a multimedia server operably coupled to the network. The multimedia server is adapted to manage a multimedia conference and includes a memory for storing selectable portions of the multimedia conference. The system further includes one or more client devices operably coupled to the network and adapted to set recording cues for choosing portions of said multimedia conference for playback. The multimedia server or clients may include a voice recognition system for transcribing audio portions of the conference. The voice recognition system may further be used to detect instances of the recording cues. In addition, in certain embodiments, the system provides for a moderator or participants to the conference an ability to adjust relevance probabilities generated upon recognition of the cues.

A method according to an embodiment of the present invention includes storing a plurality of recording cues adapted for marking a predetermined time period around which a portion of a multimedia conference is to be recorded; and capturing sequentially portions of the multimedia conference responsive to execution of the recording cues. The recording cues may be audio cues or may be whiteboard or document identifiers.

A telecommunications server according to an embodiment of the present invention is adapted to store or record a multimedia conference. In addition, the server may store a plurality of predetermined recording cues, settable by a user. The recording cues may include voice recording cues, recognizable by a voice recognition unit, or may include text or whiteboard identification recording cues. When the cues are identified, a predetermined amount of the conference is tagged or stored for summary play later. In addition, a percentage match when tags are identified may be assigned, such that the summary may be played back later based on the likelihood of a match.

A telecommunications device according to an embodiment of the present invention includes a controller and memory for implementing a multimedia conference interface. The controller allows a user to set recording cues which are recognized during the conference by a multimedia server. The multimedia server recognizes the cues during the conference, assigns a recognition relevance percentage, and records associated portions of the conference for later playback as a conference summary. According to certain embodiments of the invention, the controller allows a user to adjust the relevance percentage, either during later playback or in real-time.

A better understanding of these and other specific embodiments of the invention is obtained when the following detailed description is considered in conjunction with the following drawings.

BRIEF DESCRIPTION OF THE DRAWINGS

FIG. 4 is a diagram illustrating collaboration summarization according to an embodiment of the present invention;

FIG. 5A and FIG. 5B are flowcharts illustrating setting recording cues according to embodiments of the present invention;

FIG. 6B is a graphical user interface according to an embodiment of the present invention;

FIG. 7B is a graphical user interface according to an embodiment of the present invention;

FIG. 8 is a flowchart illustrating operation of an embodiment of the present invention;

DETAILED DESCRIPTION OF EMBODIMENTS OF THE INVENTION

Figure 1:
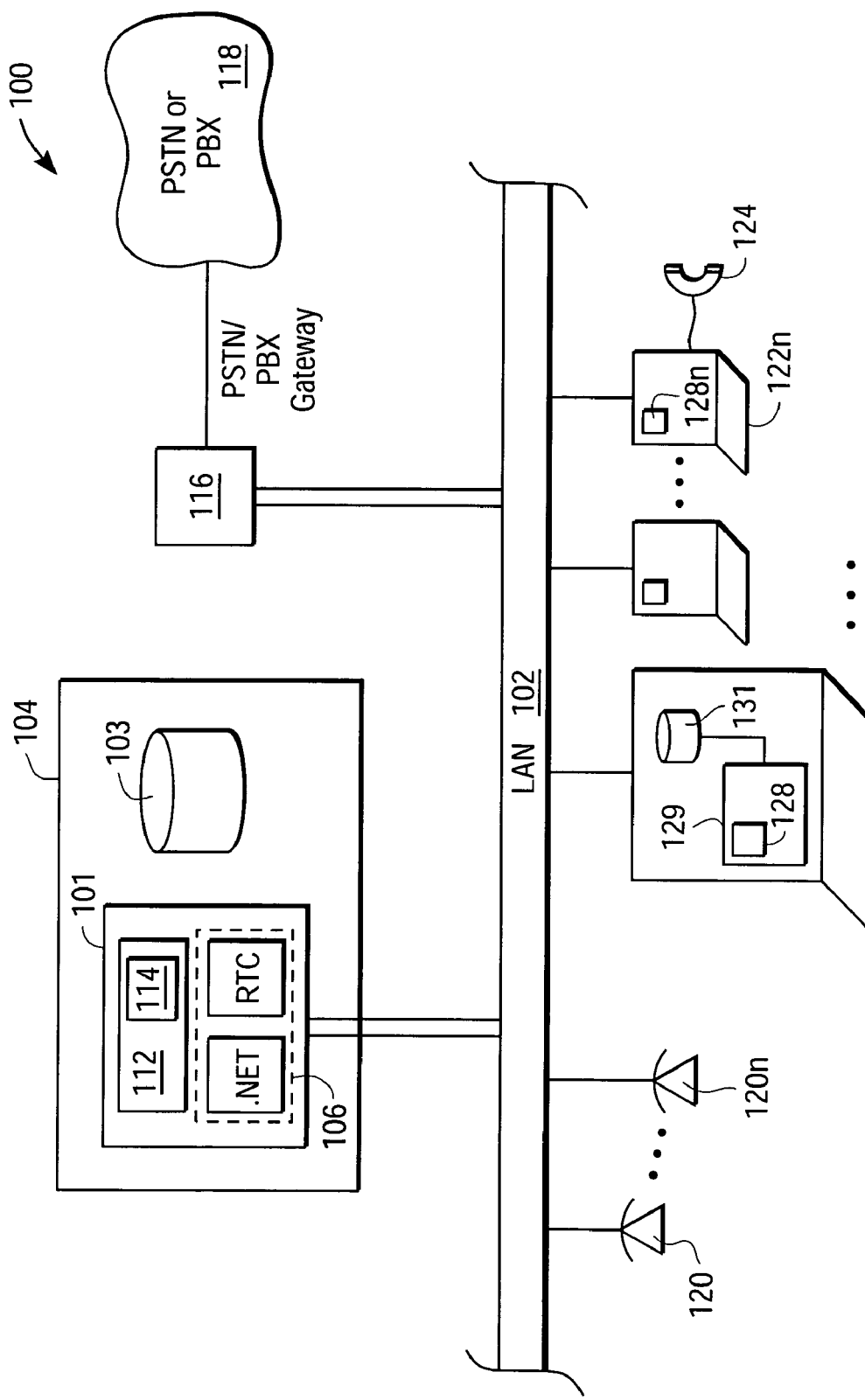
FIG. 1 is a diagram of a telecommunication system according to an embodiment of the present invention.

Turning now to the drawings and, with particular attention to FIG. 1, a diagram of an exemplary telecommunications system 100 according to an embodiment of the present invention is shown. As shown, the telecommunications system 100 includes a local area network (LAN) 102. The LAN 102 may be implemented using a TCP/IP network and may implement voice or multimedia over IP using, for example, the Session Initiation Protocol (SIP). Operably coupled to the local area network 102 is a server 104. The server 104 may include one or more controllers 101, which may be embodied as one or more microprocessors, and memory 103 for storing application programs and data. The controller 101 implements an instant messaging system 106. The instant messaging system may be embodied as Microsoft Windows Messenger or other instant messaging system. Thus, according to certain embodiments of the present invention, the instant messaging system 106 implements the Microsoft.Net environment 108 and Real Time Communications protocol (RTC) 110.

In addition, according to embodiments of the present invention, a collaboration system 114 may be provided, which may be part of an interactive suite of applications 112, run by controller 101, as will be described in greater detail below.

Also coupled to the LAN 102 is a gateway 116 which may be implemented as a gateway to a private branch exchange (PBX), the public switched telephone network (PSTN) 118, or any of a variety of other networks, such as a wireless or cellular network. In addition, one or more LAN telephones 120a-120n and one or more computers 122a-122n may be operably coupled to the LAN 102.

The computers 122a-122n may be personal computers implementing the Windows XP operating system and thus, Windows Messenger. In addition, the computers 122a-122n may include telephony and other multimedia messaging capability using, for example, peripheral cameras, microphones and speakers (not shown) or peripheral telephony handsets 124, such as the Optipoint handset, available from Siemens Corporation. In other embodiments, one or more of the computers may be implemented as wireless telephones, digital telephones, or personal digital assistants (PDAs). Thus, the figures are exemplary only. As shown with reference to computer 122a, the computers may include one or more controllers 129, such as Pentium-type microprocessors, and storage 131 for applications and other programs.

Finally, the computers 122a-122n may implement Interaction Services 128a-128n according to embodiments of the present invention. As will be described in greater detail below, the Interaction Services 128a-128n allow for interworking of phone, buddy list, instant messaging, presence, collaboration, calendar and other applications. In addition, according to embodiments of the present invention, the Interaction Services 128 allow access to the collaboration summarization module 114 of the server 104 and thus permit the user to access and manipulate conference summaries.

Figure 2:
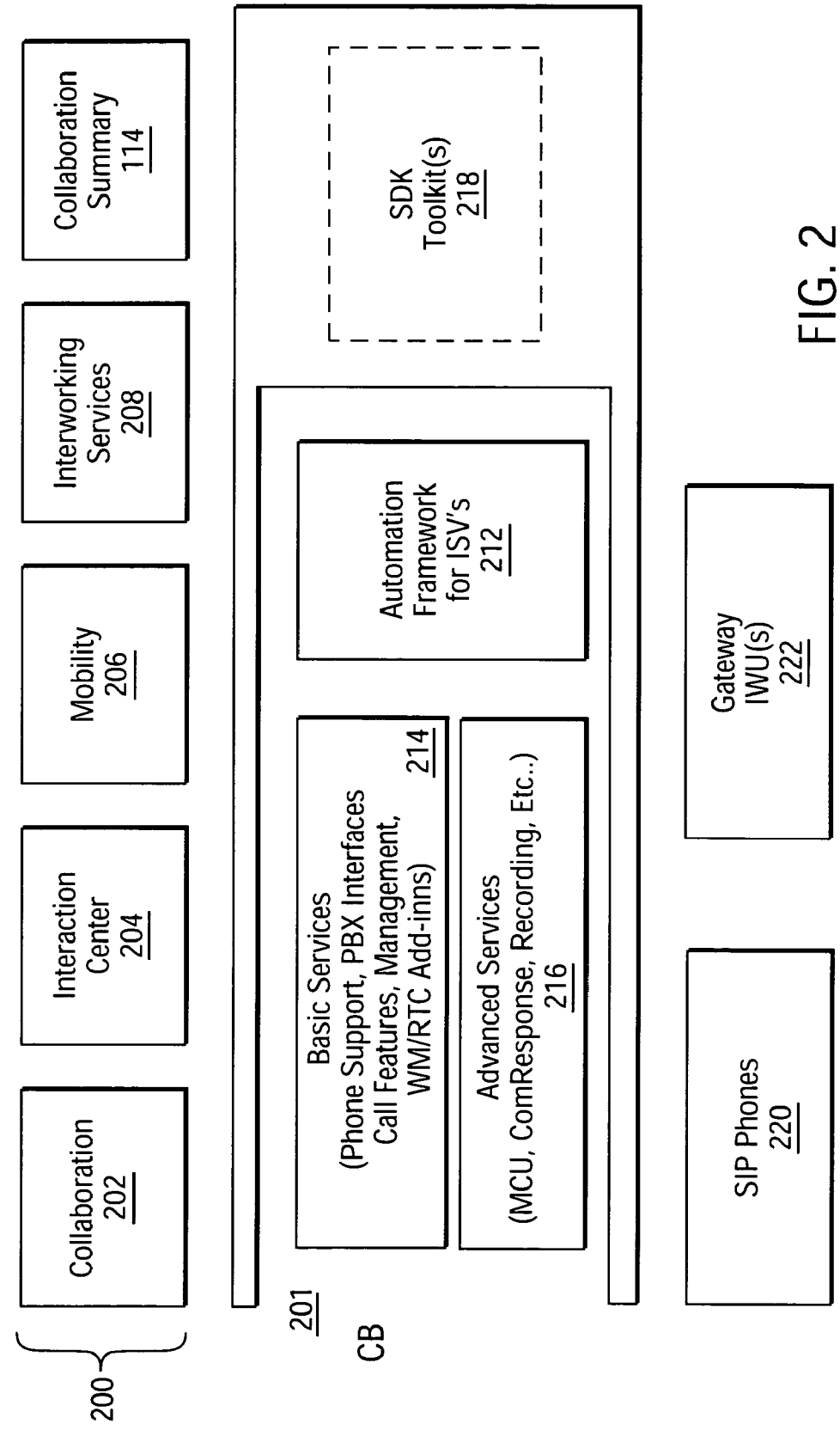
FIG. 2 is a diagram illustrating a telecommunications collaboration system according to an embodiment of the present invention.

Turning now to FIG. 2, a functional model diagram illustrating collaboration system 114 is shown. More particularly, FIG. 2 is a logical diagram illustrating a particular embodiment of a collaboration server 104. The server 104 includes a plurality of application modules 200 and a communication broker module 201. One or more of the application modules and communication broker module 201 may include an inference engine, i.e., a rules based artificial intelligence engine for implementing functions according to the present invention, as will be described in greater detail below. In addition, the server 104 provides interfaces, such as APIs (application programming interfaces) to SIP phones 220 and gateways/interworking units 222.

According to the embodiment illustrated, the broker module 201 includes a basic services module 214, an advanced services module 216, an automation module 212, and a toolkit module 218.

The basic services module 214 functions to implement, for example, phone support, PBX interfaces, call features and management, as well as Windows Messaging and RTC add-ins, when necessary. The phone support features allow maintenance of and access to buddy lists and provide presence status.

The advanced services module 216 implements function such as presence, multipoint control unit (MCU), recording, and the like. MCU functions are used for voice conferencing and support ad hoc and dynamic conference creation from a buddy list following the SIP conferencing model for ad hoc conferences. In certain embodiments, support for G.711 and G.723.1 codecs is provided. Further, in certain embodiments, the MCU can distribute media processing over multiple servers using the MEGACO protocol.

Presence features provide device context for both SIP registered devices and user-defined non-SIP devices. Various user contexts, such as In Meeting, On Vacation, In the Office, etc., can be provided for. In addition, voice, e-mail and instant messaging availability may be provided across the user's devices. The presence feature enables real time call control using presence information, e.g., to choose a destination based on the presence of a user's devices. In addition, various components have a central repository for presence information and for changing and querying presence information. In addition, the presence module provides a user interface for presenting the user with presence information.

In addition, the broker module 201 may include the ComResponse platform, available from Siemens Information and Communication Networks, Inc. ComResponse features include speech recognition, speech-to-text, and text-to-speech, and allow for creation of scripts for applications. The speech recognition and speech-to-text features may be used by the collaboration summarization unit 114, as will be discussed in greater detail below.

In addition, real time call control is provided by a SIP API 220 associated with the basic services module 214. That is, calls can be intercepted in progress and real time actions performed on them, including directing those calls to alternate destinations based on rules and or other stimuli. The SIP API 220 also provides call progress monitoring capabilities and for reporting status of such calls to interested applications. The SIP API 220 also provides for call control from the user interface.

According to the embodiment illustrated, the application modules include a collaboration module 202, an interaction center module 204, a mobility module 206, an interworking services module 208, and a collaboration summarization module 114.

The collaboration module 202 allows for creation, modification or deletion of a collaboration session for a group of users. The collaboration module 202 may further allow for invoking a voice conference from any client. In addition, the collaboration module 202 can launch a multi-media conferencing package, such as the WebEx package. It is noted that the multi-media conferencing can be handled by other products.

The interaction center 204 provides a telephony interface for both subscribers and guests. Subscriber access functions include calendar access and voicemail and e-mail access. The calendar access allows the subscriber to accept, decline, or modify appointments, as well as block out particular times. The voicemail and e-mail access allows the subscriber to access and sort messages.

Similarly, the guest access feature allows the guest access to voicemail for leaving messages and calendar functions for scheduling, canceling, and modifying appointments with subscribers. Further, the guest access feature allows a guest user to access specific data meant for them, e.g., receiving e-mail and fax back, etc.

The mobility module 206 provides for message forwarding and "one number" access across media, and message "morphing" across media for the subscriber. Further, various applications can send notification messages to a variety of destinations, such as e-mails, instant messages, pagers, and the like. In addition, the subscriber can set rules that the mobility module 206 uses to define media handling, such as e-mail, voice and instant messaging handling. Such rules specify data and associated actions. For example, a rule could be defined to say "If I'm traveling, and I get a voicemail or e-mail marked Urgent, then page me."

Further, as will be explained in greater detail below, the collaboration summarization module 114 is used to identify or highlight portions of a multimedia conference and configure the portions sequentially for later playback. The portions may be stored or identified based on recording cues either preset or settable by one or more of the participants in the conference, such as a moderator. As will be explained in greater detail below, the recording cues may be based on vocalized keywords identified by the voice recognition unit of the ComResponse module, or may be invoked by special controls or video or whiteboarding or other identifiers.

Figure 3:
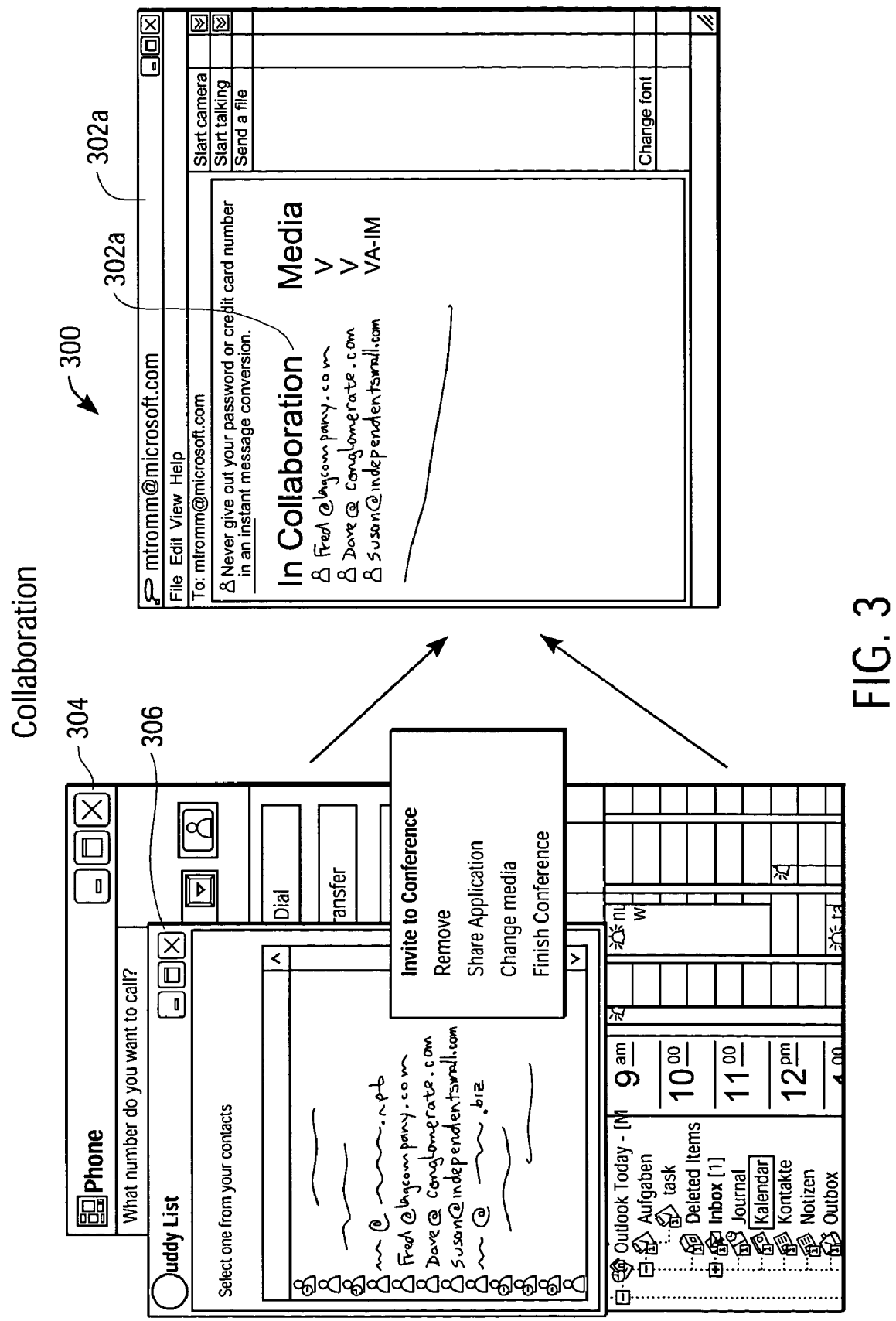
FIG. 3 is a diagram illustrating a graphical user interface according to an embodiment of the present invention.

Turning now to FIG. 3, a diagram of a graphical user interface 300 according to embodiments of the present invention is shown. In particular, shown are a variety of windows for invoking various functions. Such a graphical user interface 300 may be implemented on one or more of the network clients. Thus, the graphical user interface 300 interacts with the Interactive Services unit 128 to control collaboration sessions.

Shown are a collaboration interface 302, a phone interface 304, and a buddy list 306. It is noted that other functional interfaces may be provided. According to particular embodiments, certain of the interfaces may be based on, be similar to, or interwork with, those provided by Microsoft Windows Messenger or Outlook.

The buddy list 306 is used to set up instant messaging calls and/or multimedia conferences. The phone interface 304 is used to make calls, e.g., by typing in a phone number, and also allows invocation of supplementary service functions such as transfer, forward, etc. The collaboration interface 302 allows for viewing the parties to a collaboration 302a and the type of media involved. It is noted that, while illustrated in the context of personal computers 122, similar interfaces may be provided the telephones or cellular telephones or PDAs.

As noted above, an aspect of the present invention allows selective summarization based on recognition of recording cues. FIG. 4 is a diagram schematically illustrating collaboration summarization according to an embodiment of the present invention. More particularly, shown are a plurality of media streams representative of, for example, a multimedia conference between multiple parties. Shown are a whiteboard stream 400, an audio stream 402, a video stream 404, and an instant messaging stream 406. It is noted that, in practice, more or fewer of such data streams may be present. Thus, the figure is exemplary only.

Also shown in FIG. 4 is a time scale 408 showing a time T1. The time T1 represents, for example, a duration of the conference and hence the period required to review the conference in its entirety once it has been recorded. According to the present invention, however, a participant in the conference, such as a designated moderator, can set and activate or invoke a recording cue, which causes the collaboration summarization system to either mark predetermined periods on the recorded conference or save predetermined periods as a separate summary file. As shown in FIG. 4, at a time Ta, a user activates a recording cue 4000. A period 410 of the conference is then either marked or stored in memory 103 for later playback as part of a collaboration summary. Similarly, at time Tb, another recording cue is activated and a period 412 is then either marked or stored for later playback as part of a collaboration summary. As seen at 416, the result on playback is a summary of the multimedia conference of duration T2.

Figure 5C:
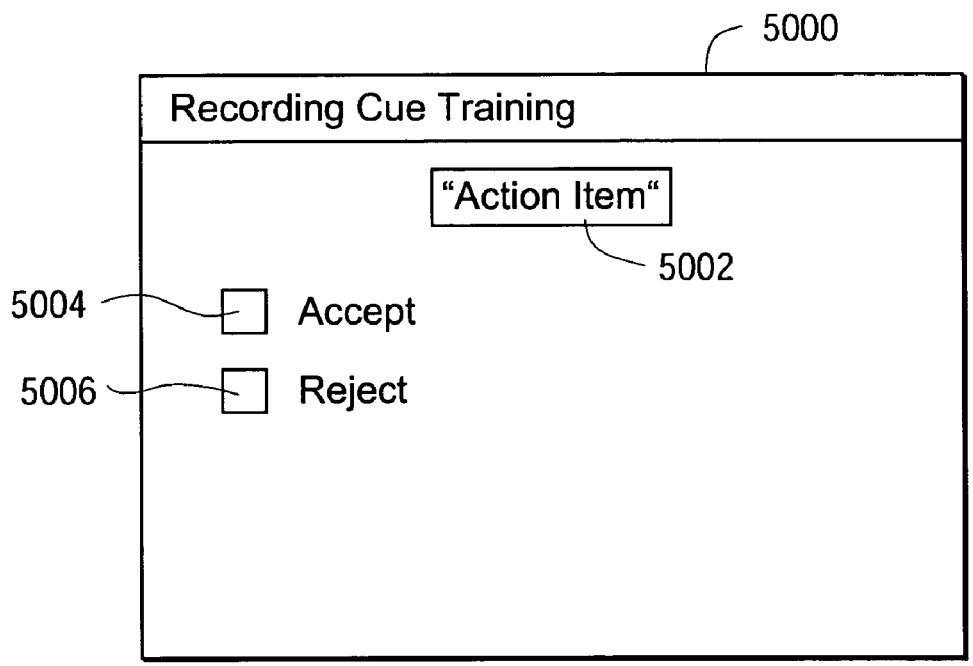
FIG. 5C is a graphical user interface according to an embodiment of the present invention.

FIG. 5A and FIG. 5B are flowcharts illustrating setting recording cues or keywords for conference summarization according to embodiments of the present invention. FIG. 5C illustrates an exemplary user interface window 5000 that may be used to set the recording cue(s). Shown are a cue display area 5002 for displaying the recited cue and accept and reject buttons 5004, 5006. The user interface window 5000 may be generated by or in association with the interaction services module 128 of the client 122 and in communication with the collaboration module 114 of the server 104.

As shown in FIG. 5A, a moderator may set recording cues or keywords for later use in a conference. At 502a, the moderator speaks or otherwise enters the desired recording cue. For example, the moderator may set phrases such as "Action Item," "A decision has been reached," "We have a consensus," "Our next meeting will be . . . " and the like. The computer's sound system will receive the cue and display it at 5002 on the graphical user interface of FIG. 5C. In other embodiments, the user can type in a recording cue that will be recognized either from the speech unit of the ComResponse platform or from transcribed text. Alternatively, the user may define a particular entry into whiteboard or instant messaging windows as the recording cue. For example, the moderator may indicate that an R in the whiteboard window means that the contents should be recorded. Alternatively, an X through it should indicate it should not. The user than has an option of accepting or rejecting the cue, by selecting the buttons 5004, 5006 (FIG. 5C). If rejected, the user can re-try. If accepted, the collaboration summarization system 114 will then record the cue at 504a (e.g., store it in a database in memory 103) and monitor the conference for instances of the cue at 506a, as will be explained in greater detail below.

It is noted that an accept/reject option may also be provided for video or other cues, as well.

In addition to, or instead of, the moderator setting the recording cues, in certain embodiments, the recording cues may be set by the individual users prior to beginning the conference. This may be particularly useful if, for example, a voice response system needs to learn the voices of various participants. As shown in FIG. 5B, at step 502b, the system may connect the conferees and enter a training mode. In the training mode, while the users may be connected to the server, they are not necessarily connected to one another. At step 504b, the users may each set their cues, in a manner similar to that described above with reference to FIG. 5A and FIG. 5C. The training mode may allow, for example, the users to each set various phrases as recording cues and may allow the system to establish a personalized summary of the conference, keyed to the person who made the cue. At step 506b, the system stores the cues in memory 103 for use during the conference and then connects the users.

Figure 5D:
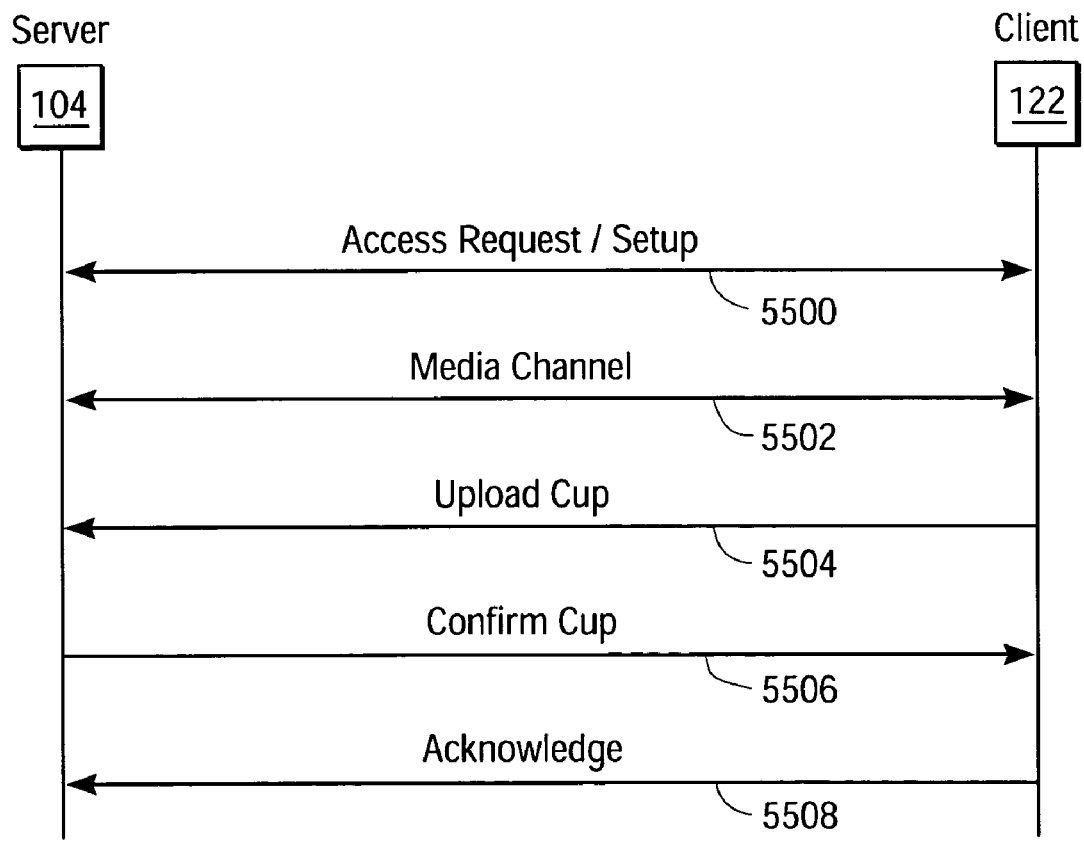
FIG. 5D illustrates signaling for recording cue training according to an embodiment of the present invention.

Signaling for exemplary system recording cue training is shown in FIG. 5D. Shown are a server 104 and a client 122, which may represent the conference moderator or a participant. At 5500, the client 122 requests and receives access to the server 104 for a media session. This can include, for example, a SIP INVITE, RINGING, OK sequence, for example. At 5502, the server 104 and the client 122 open a media channel and the client 122 accesses the collaboration system 114. At 5504, the client 122 uploads the recording cue. As discussed above, this can include a voice or video cue, or whiteboard, etc., markup. At 5506, the collaboration system 114 downloads a confirmation of the recording cue and stores it. For example, it may convert the speech to text and download the text, or may store and analyze the cue and repeat it back, for confirmation. If the cue is appropriately confirmed, then at 5508, the client 122 sends an acknowledge.

Figure 6A:
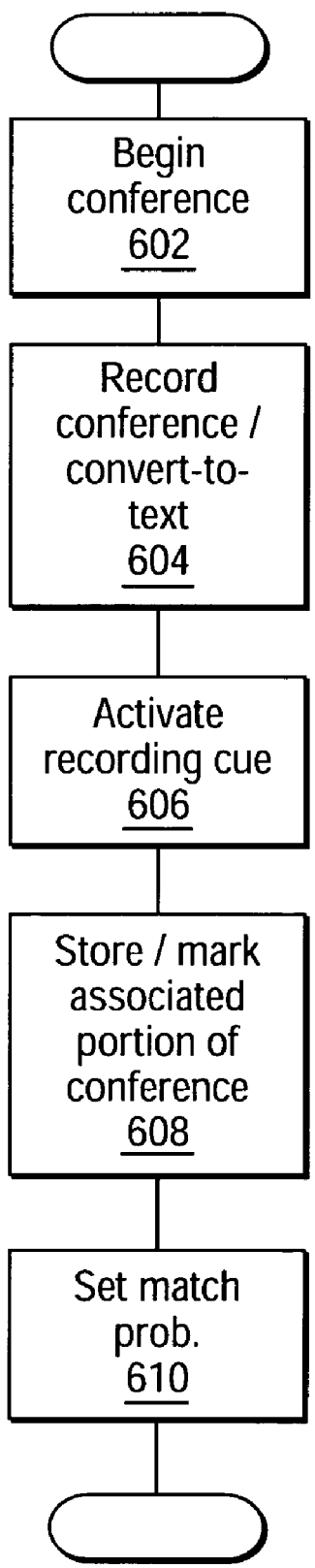
FIG. 6A is a flowchart illustrating operation of an embodiment of the present invention.

FIG. 6A and FIG. 6B illustrate conferencing and activating recording cues according to an embodiment of the present invention. FIG. 6A is a flowchart illustrating operation of a collaboration according to an embodiment of the present invention. FIG. 6B illustrates an exemplary graphical user interface for use with a collaboration summarization session. In particular, shown are a master window 6000a, a whiteboard application window 6000b, and a chat/document window 6000c. It is noted that in other embodiments, more or fewer of each type of window, as well as windows pertaining to other functions, may also be present. In the embodiment illustrated, the master window 6000a includes a In Collaboration field 6002 which defines the participants to the conference; a speech-to-text field 6004 for displaying the converted audio into text; and an Activate Cue button 6006. It is noted that in certain embodiments, in which audio cues are used exclusively, the Activate Cue button 6006 might not be present.

Turning now to FIG. 6A, at 604, the conference begins, with the users all connected via the server, using various media. As noted above, such a conference can include various combinations of media such as voice, video, Instant Messaging, application sharing, whiteboarding, and the like. At 602, the collaboration system records the entirety of the multimedia conference, including all threads and media, by storing it in memory 103. Further, in certain embodiments, the collaboration system activates a speech-to-text unit, e.g., the ComResponse platform, to transcribe all speech from the voice and video channels, which is also stored in association with the conference in memory 103. The window 6004 (FIG. 6B) may be used to display the transcription. At 606, the moderator or one of the users activates one of the recording cues. The recording cue may be activated, for example, by the user or moderator speaking it or by marking the whiteboard or other document being collaborated on. Alternatively, in certain embodiments, the recording cue may be activated by selecting a button or key associated with the client. For example, with reference to FIG. 6B, the user may activate the button 6006; or may draw the X 6008 in the whiteboarding window 6000b; or may activate the Record button 6010 of the chat/shared application window 6000c. The invoking of the recording cue may occur by the moderator or party formally invoking it, or by the system "picking up" the use of it during the conference.

In response, at 608 (FIG. 6A), the collaboration summarization system 114 either marks the point on the master recording of the conference where the cue was invoked for later playback, or stores in a separate file the associated passage, also for later playback. In either case, the conference portion pertinent to the cue is designated for later playback. In certain embodiments, the summarization is stored or marked or categorized by the party who has invoked the cue. In such an embodiment, a moderator may maintain a master summarization record. In other embodiments, the summarization occurs on a singular basis—i.e., only one summarization is performed, regardless of the invoking party. Finally, at step 610, a match or relevance probability is set in association with the marked or recorded summarization portion of the conference. Any of a variety of probability matching methods may be employed. In this manner, each part of the conference is captured, separated and marked with a probability of its relevance.

Figure 6C:
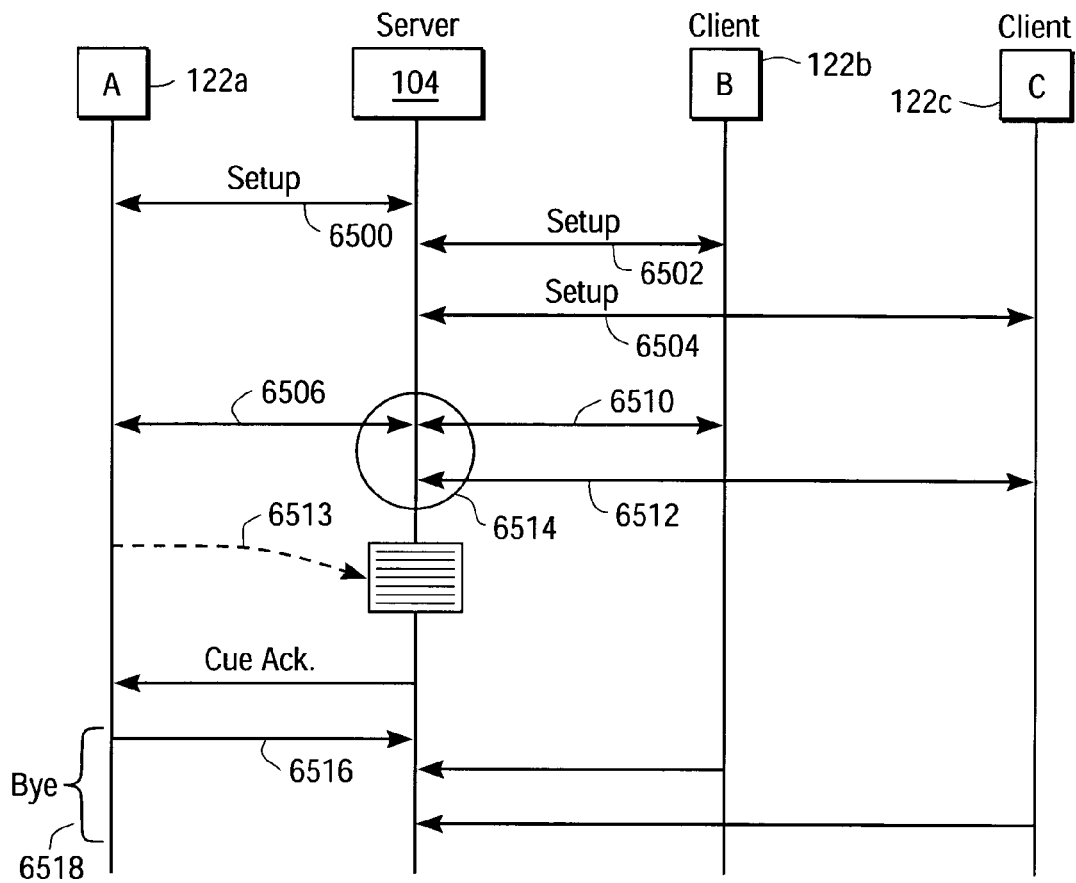
FIG. 6C illustrates signaling for collaboration summarization recording according to an embodiment of the present invention.

FIG. 6C illustrates signaling for a conference summarization session according to an embodiment of the present invention. Shown are a Client A 122a, which may also be the moderator; a server, and a Client B 122b and a Client C 122c. At 6500, the client A or moderator initiates a connection with the server 104, identifies the session as a conference, and identifies the other parties. At 6502 and 6504, the other parties to the conference, Client B and Client C, likewise log in to the server 104. As in the recording cue case, the log in process can be in accordance with the SIP protocol. Next, at 6506, 6508, and 6510, the clients 122a-122c establish media connections via the server 104. At 6512, the server 104 records the conference and the collaboration summarization system 114 monitors the ongoing media for the recording cue(s). If a recording cue is detected, then at 6514, the collaboration summarization system 114 records or marks the relevant passage or clip or portion of the conference as part of the summary as it is stored in memory. In addition, the collaboration summarization system 114 may return a cue acknowledge signal to the moderator to indicate that the cue was received or detected. The conference can be terminated at 6518 in a known manner.

Figure 7A:
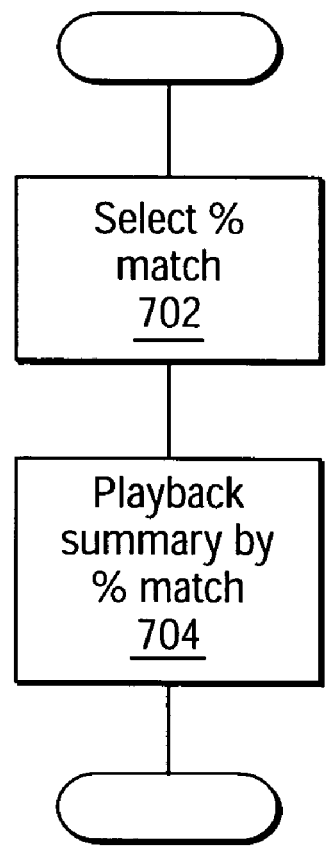
FIG. 7A is a flowchart illustrating operation of an embodiment of the present invention.

FIG. 7A and FIG. 7B illustrate playing a summarization according to an embodiment of the present invention. FIG. 7A is a flowchart illustrating operation of a playback embodiment of the present invention. FIG. 7B is an exemplary user interface 7000 for the playback.

As shown in FIG. 7B, the interface includes a conference list 7002 listing conferences that have been saved and summarized; one or more viewing windows 7004; a play button 7006; a relevance probability entry field 7008; and training buttons 7010.

Turning now to FIG. 7A, at step 702, the user desiring a summary will activate a summary function using his GUI 7000, for example, by selecting the conference from the conference window 7002 and selecting the play button 7006.

In certain embodiments, a default match percentage will be used to deliver the summary. In other embodiments, the user can designate a percentage match threshold using the match field 7008—for matches to the cue higher than the threshold, the system will play back a summary. As noted above, in certain embodiments, this can be embodied as playing back a single file containing all media above the threshold, or can be embodied as accessing a single broad summary file with relevant passages at the desired percent match marked. At 704, the system will access the stored conference and play back the summary according to the percent match.

Figure 7C:
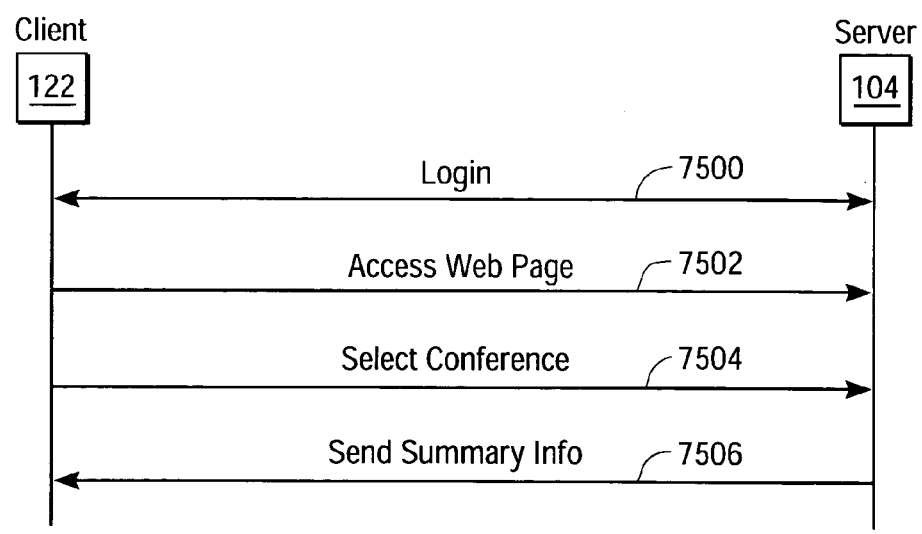
FIG. 7C illustrates signaling for summarization access according to an embodiment of the present invention.

FIG. 7C illustrates signaling for summary access according to an embodiment of the present invention. Shown are a client 122 and server 104. At 7500, the client 122 logs in to the server 104. At 7502, the client accesses, for example, a web page interface, such as described above. At 7504, the user can select the summary for viewing. As noted above, this can include specifying percent matches, and the like. Finally, at 7506, the server 104 sends back the appropriate summary from memory 103. It is noted that, in other embodiments, the entirety of the summary can be downloaded, and thereafter accessed locally.

As noted above, the system can be trained to recognize cues prior to the start of a conference. FIG. 8 illustrates another way of training the system. More particularly, a user can activate approval indicia, such as "thumbs up" or "thumbs down" (or good-bad) buttons when playing back his selected summary. That is, each time the user detects an inaccuracy on behalf of the system, he can select the "thumbs down" button and each time he is satisfied, he can push the "thumbs up" button. This is interpreted by the system and can be used when the same scenario occurs in the future. Such good-bad buttons 7010 are illustrated in FIG. 7B.

Operation of this training method is illustrated more particularly with reference to FIG. 8. In particular, at 802, the user elects to playback the selected summary. At 804, the user presses the "thumbs up" or "thumbs down" buttons to indicate approval or disapproval. At 806, the system stores the approval-disapproval after identifying the context. The knowledge can then be used on subsequent occasions when the context occurs again. That is, the collaboration system 114 can learn whether a cue was correctly detected as having been invoked. Thus, the next time a cue is determined to be invoked, the system can check both its database of "user-set" cues and cross-reference its record of "learned" probabilities. Further, such training can be used by the collaboration summarization system 114 to search through and update other stored summarizations, if desired.

Figure 9A:
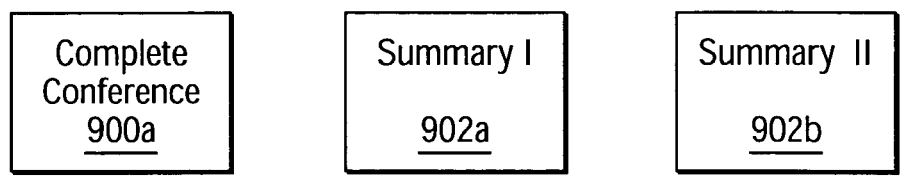
FIG. 9A and FIG. 9B represent schematically the storage of the recorded conference and summarization(s)

As noted above, the summarization can be stored by the system either as a completely separate file or as indices marking "points" on the complete conference recording. This is illustrated more particularly with reference to FIGS. 9A and 9B. Shown in FIG. 9A is a file 900a representing the complete recorded conference. Also shown are files 902a, 902b representing one or more recorded summaries of the conference. In certain embodiments, each file represents a complete summary based on a particular user's automatic or deliberate invocation of recording cues. In certain embodiments, only one such file will be created (i.e., based on the moderator's cuing). Alternatively, each file can represent a complete summary based on a percent match with the recording cue.

Figure 9B:
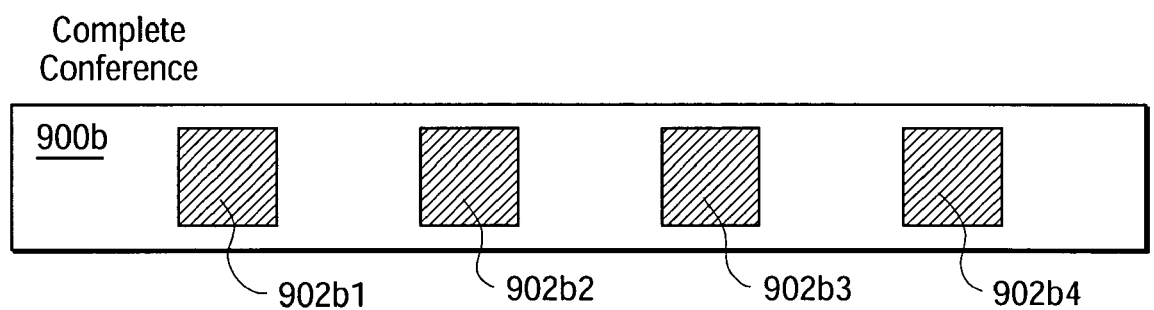

FIG. 9B illustrates indexing against the recorded conference. More particularly, 902b represents the recorded complete conference. Shown at 902b1, 902b2, 902b3, 902b4, are indices representing invocation of recording cues, marked, for example, by a time stamp on the recorded conference 900b. Again, the recording cues can be invoked by the moderator or parties to the conference. The indices can be unique to the party invoking the cue. Alternatively, only the moderator can be allowed to invoke cues other than automatic ones.

Figure 10:
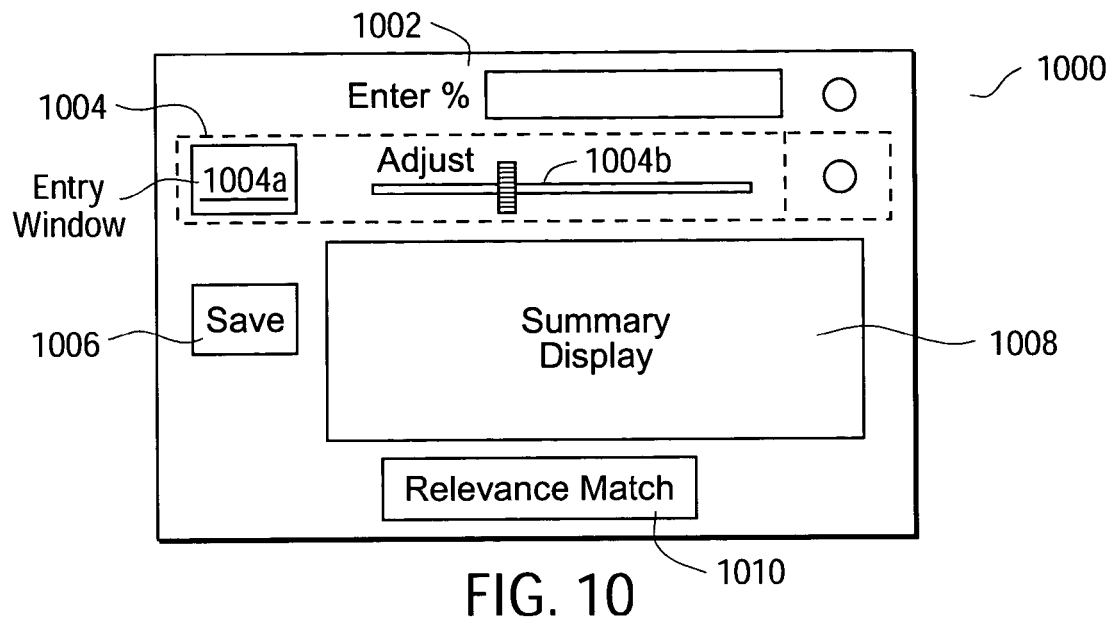
FIG. 10 is a graphical user interface according to an embodiment of the present invention.

As noted above, one aspect of the present invention provides users with the ability to adjust a relevance probability associated with a cue. FIG. 10 is a diagram of an exemplary graphical user interface generated by the interaction services module 128 (FIG. 1) that allows the user to do so. More particularly, the graphical user interface 1000 includes a relevance entry field 1002, a relevance adjustment interface 1004, save button 1006, one or more summary displays 1008, and a relevance match display 1010. The relevance entry field 1002 allows the user to select a conference and pull up a summary based on the entered relevance probability. Thus, the summary will include all captured portions of the conference having the input relevance probability. The relevance match display 1010 allows the user to view the relevance of the summary or portions of the summary being shown. The summary displays 1008 can be used to display video, speech-to-text, whiteboarding, etc., as described above. As will be discussed in greater detail below, the relevance adjustment interface 1004 allows the user to adjust the relevance of the summary portion being shown. In the embodiment illustrated, the relevance interface 1004 includes an entry window 1004a for typing in a new adjusted relevance and a slide bar 1004b for perhaps quicker adjustments. The new summary and the new relevance entries can be saved using save button 1006.

Figure 11:
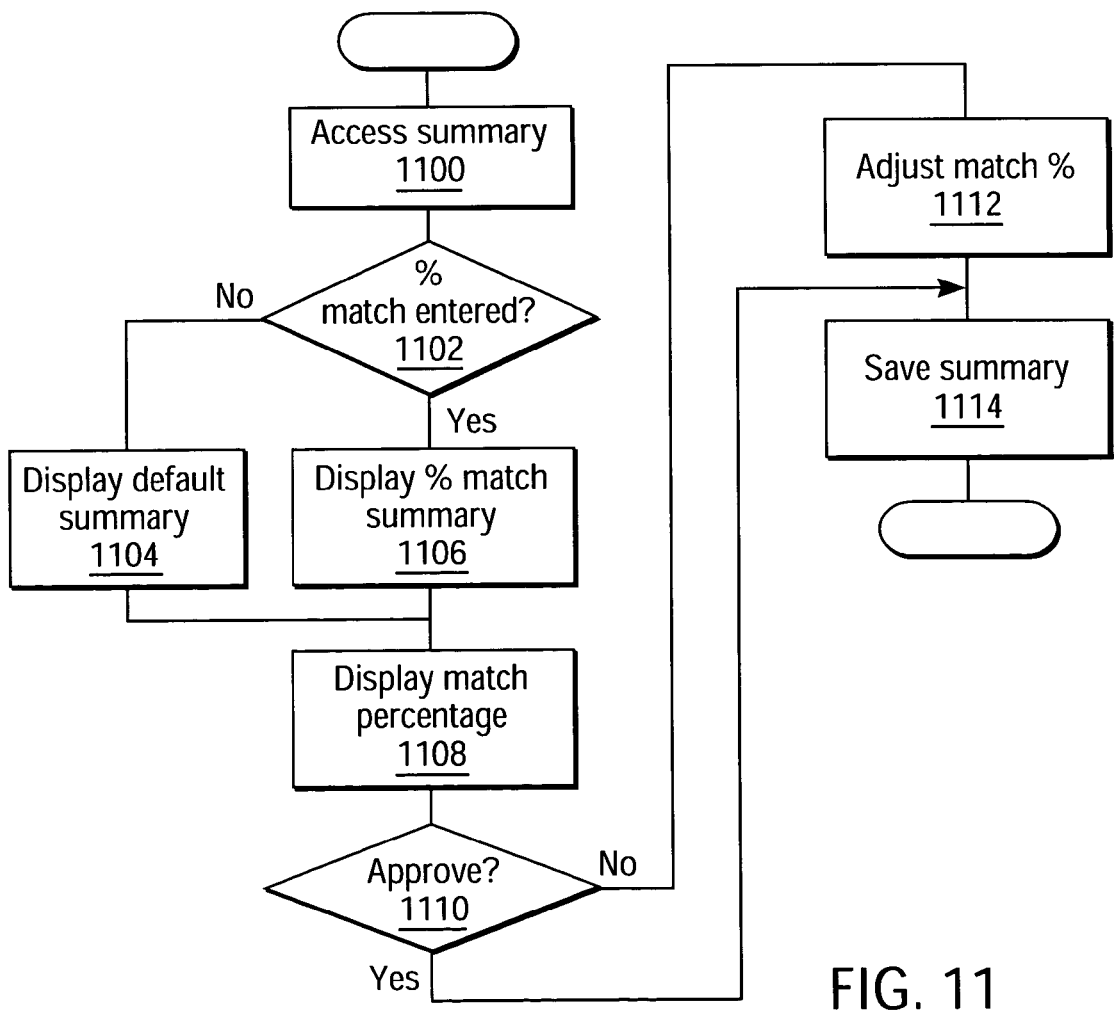
FIG. 11 is a flowchart illustrating operation of an embodiment of the present invention.

FIG. 11 is a flowchart illustrating operation of an embodiment of the present invention and showing the use of the interface 1000. In step 1100, a summary for a particular conference is accessed. Thus, the interaction services module 128 of the client logs in to the collaboration system 114 (FIG. 1). In step 1102, the relevance probability may be entered and received by the collaboration module 114. If the probability is not entered, then the collaboration system 114 can display a summary according to a default probability, in step 1104. Otherwise, in step 1106, the collaboration module 114 displays for the interaction services module 128 the summary having the input relevance probability, for example, using the windows 1008 (FIG. 10). In step 1108, the interaction services module displays the relevance probability for the summary portion being shown. At step 1110, the interaction services module 114 allows the user to approve or adjust the displayed relevance probability. If the user chooses to do so, he can, using the graphical user interface 1000 (FIG. 10) and particularly, the adjustment interface 1004. Finally, at step 1114, the user can save the selection to memory 103 with the updated relevance probability.

As noted above, in certain embodiments, the relevance probability adjustment can be made in real-time, either by a moderator or other participants, while the conference is ongoing. In such embodiments, once the relevance probabilities have been adjusted, the system may take into account the new probabilities when determining a next match.

Figure 12:
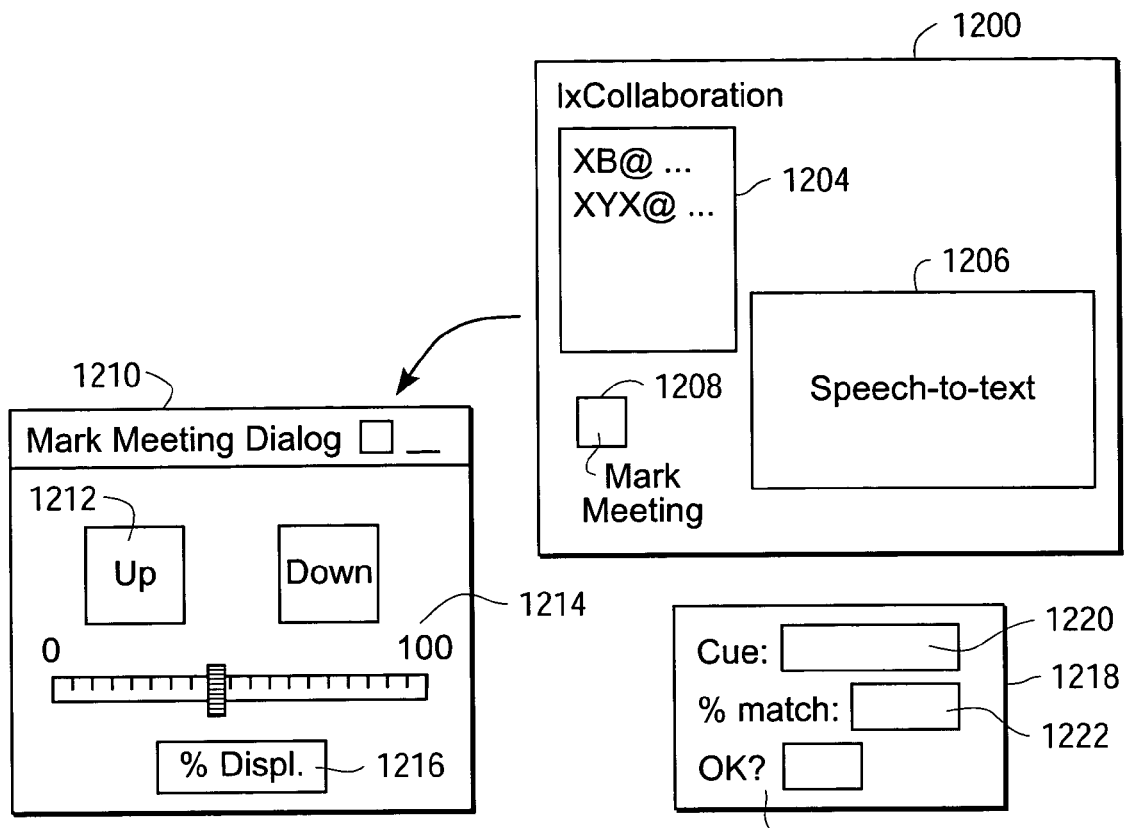
FIG. 12 is a graphical user interface according to an embodiment of the present invention.

Shown in FIG. 12 is an exemplary graphical user interface for doing so. In particular, shown is a window 1200 having a party display 1204, a speech to text window 1206, and a Mark Meeting control 1208. Other media windows would typically also be used for the conference, but are omitted for sake of simplicity. Moreover, the configuration shown is exemplary only. The party display 1204 shows the addresses and/or identities of the participants in the conference. The speech-to-text display 1206 can be used to display the text-converted audio portion of the conference. The Mark Meeting control 1208 may be embodied as a button or hyperlink that generates either or both of windows 1210 and 1218. The windows 1210 and 1218 allow for a Mark Meeting dialog and may be embodied in a same window. In certain embodiments, only one of the windows 11210 and 1218 are present.

The window 1210 includes one or more relevance probability interfaces 1212, 1214, 1216. As shown, the interface 1212 includes UP-DOWN buttons for adjusting the displayed relevance probability up or down. The interface 1214 includes a slide bar 1214 for, perhaps, an easier adjustment. Finally, interface 1216 displays the probability and allows the user to type in the new one, if desired.

The window 1218 includes a cue display 1220, a relevance display 1222, and an accept control 1224. The cue display 1220 displays the cue that was detected and that caused the capture of the portion of the conference. The relevance probability display 1222 displays the relevance; and the accept control 1224 allows the user to accept the capture with the displayed relevance.

Figure 13:
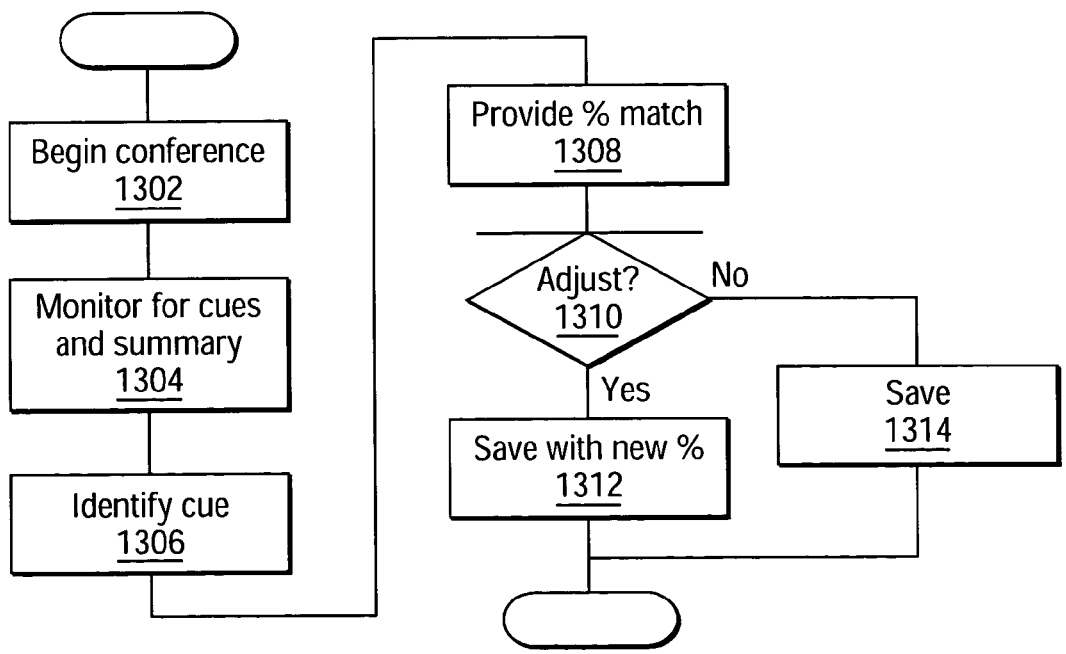
FIG. 13 is a flowchart illustrating operation of an embodiment of the present invention.

Use of a graphical user interface such as that of FIG. 12 by a moderator to set relevance probabilities is shown in the flowchart of FIG. 13. In particular, in a step 1302, the conference begins, in a manner similar to that discussed above. In step 1304, the collaboration system 114 (FIG. 1) monitors the conference for the recording cues. In step 1306, the collaboration system 114 detects a cue and displays it, for example, using the window 1218 (FIG. 12). At step 1308, the collaboration module 114 displays the relevance probability, typically using either the window 1218 or 1210. At step 1310, the user can elect to adjust the relevance, for example, by clicking on control 1208 to generate window 1210 and adjust the relevance using the associated controls. If the user chooses not to adjust the relevance, then the summary portion can be save, at step 1314, with the system-determined relevance. Otherwise, the collaboration system 114 saves the conference portion to memory 103 according to the adjusted relevance. In certain embodiments, the adjusted relevance probability can then be taken into account by the system on subsequent occasions when the associated cue is detected.

Figure 14A:
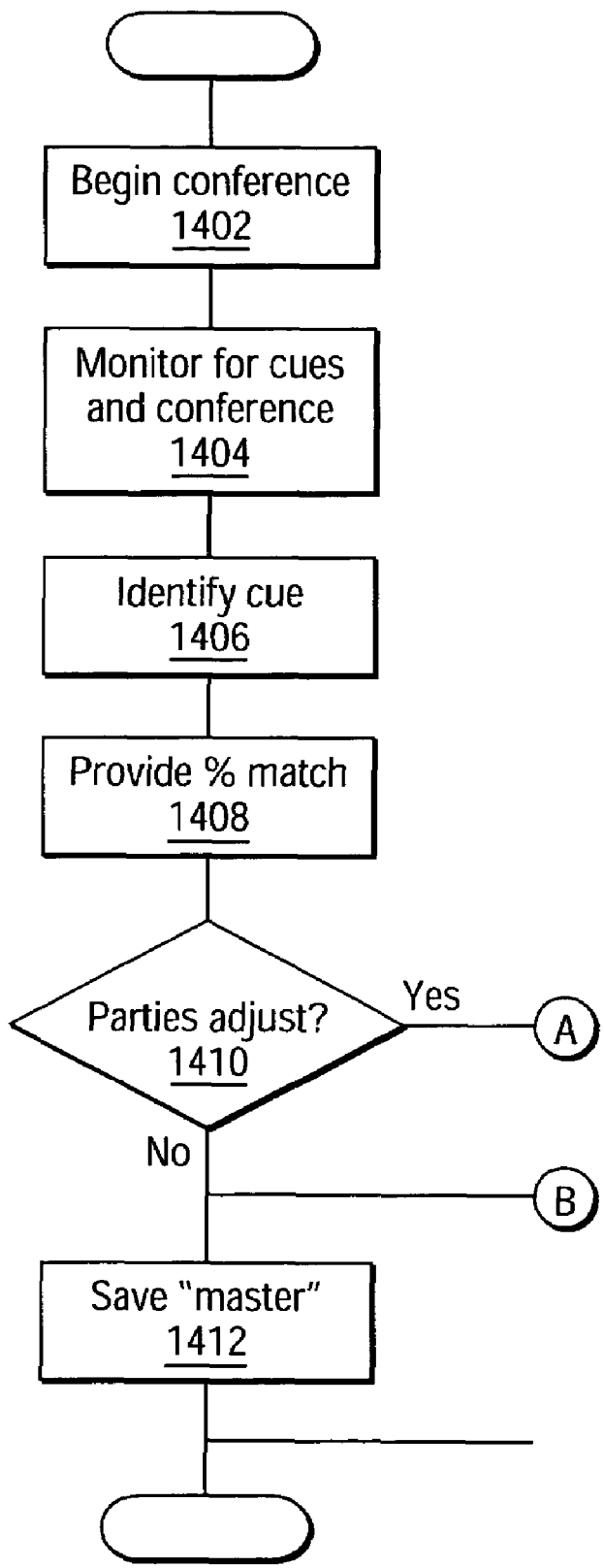
FIGS. 14A-14D is a flowchart illustrating operation of an embodiment of the present invention.

As noted above, in addition to a single participant or moderator, in certain embodiments, more than one party can adjust the relevances on the fly. This is illustrated with reference to FIGS. 14A-14D. As in the embodiment of FIG. 13, the users can make use of an interface similar to that of FIG. 12. Turning now to FIG. 14A, at step 1402, the parties begin the conference. In step 1404, the collaboration system 114 (FIG. 1) monitors the conference for the recording cues. In step 1406, the collaboration system 114 detects a cue and displays it, for example, using the window 1218 (FIG. 12). At step 1408, the collaboration module 114 displays the relevance probability, typically using either the window 1218 or 1210. The display of the relevance and cue can be either on a global basis, i.e., for all parties, or on a per-user basis, i.e., only for the invoking party (and perhaps, also, the moderator). If no party adjusts the relevance, and the cue is accepted, then in step 1412, the associated conference portion is saved to a master summary with the generated relevance.

Figure 14B:
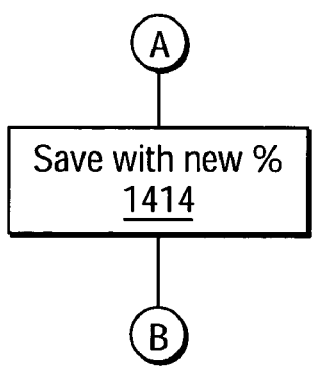
Figure 14C:
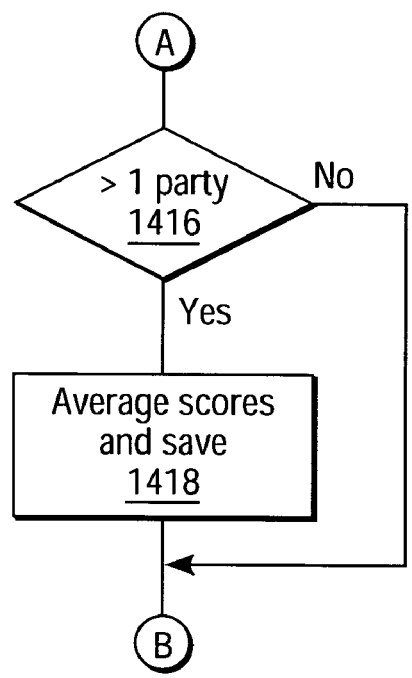
Figure 14D:
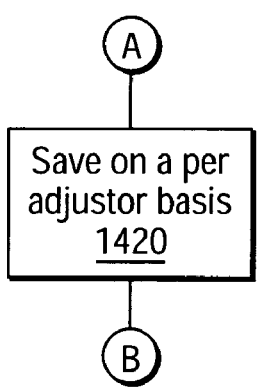

Otherwise, depending on the embodiment, the collaboration system will proceed according to FIG. 14B, FIG. 14C, or FIG. 14D. In FIG. 14B, if only one participant adjusts the relevance or if the system doesn't care how many people adjust it, then in step 1414, the relevance is updated as described above. In such a case, typically, then, only the last person to make the update will have his views reflected in the stored summary.

Otherwise, in FIG. 14C, the system will determine how many parties have made an update. If more than one party makes an input as determined in step 1416, then in step 1418, the collaboration module 114 will average the scores and save the summary portion according to the average, in step 1418. In such an embodiment, it may be desirable to provide each party with a weighting factor and, in particular, to provide the moderator with the highest weighting factor, and determine the final relevance based on a weighted average. Finally, as shown in FIG. 14D, the collaboration system may save the summary portion on a per user basis, in step 1420, with each party having a summary based on his relevances. In such an embodiment, a master, typically saved according to the moderator's scores, would also be stored.

Figure 15:
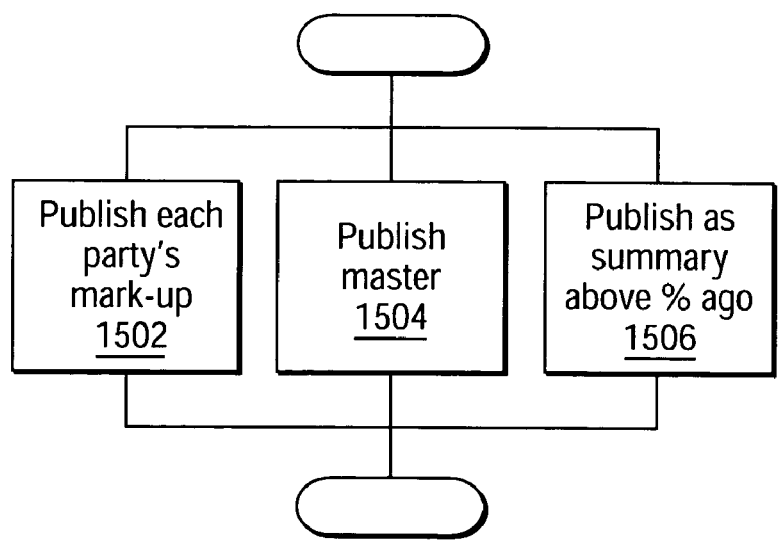
FIG. 15 is a flowchart illustrating operation of an embodiment of the present invention.

When the conference is ended, as shown in FIG. 15, a summary or summaries may be stored and made available for access ("published") in a variety of ways, depending on how the relevances were allowed to be adjusted. Thus, at step 1502, each party's marked up summary may be made available for access. Additionally, or in the alternative, a mater summary may be made available for access, in step 1504. This can be the moderator's mark up or the averaged mark up, for example. Finally, at step 1506, the only summary made available might be one that takes into account all user's mark ups, but on a "highest overall relevance" basis.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications method, comprising:
    storing a plurality of recording cues, said recording cues adapted for marking a predetermined time period around which a portion of a multimedia conference is to be recorded;
    capturing sequentially portions of said multimedia conference responsive to execution of said plurality of recording cues; and
    assigning an adjustable relevance probability when said capturing occurs;
    wherein said assigning comprises one or more users adjusting a system-assigned probability in real-time during said multimedia conference;
    wherein said assigning comprises averaging a probability score set by one or more parties.

2. A telecommunications method, comprising:
    storing a plurality of recording cues, said recording cues adapted for marking a predetermined time period around which a portion of a multimedia conference is to be recorded;
    capturing sequentially portions of said multimedia conference responsive to execution of said plurality of recording cues; and
    assigning an adjustable relevance probability weighted in association with identities of parties.

3. A telecommunications method in accordance with claim 2, further comprising adjusting said relevance probability during a review of a summary of the conference.

4. A telecommunications method in accordance with claim 2, wherein said assigning comprises one or more users adjusting a system-assigned probability in real-time during said multimedia conference.

5. A telecommunications method in accordance with claim 4, wherein said assigning comprises assigning a relevance probability and saving an associated summary on a per user basis.

6. A telecommunications method in accordance with claim 5, further comprising playing back captured portions having a selectable probability.

7. A telecommunications system, comprising:
a local area network (LAN);
a multimedia server operably coupled to said network, said multimedia server adapted to manage a multimedia conference and including a memory for storing selectable portions of said multimedia conference;
one or more client devices operably coupled to said LAN and adapted to set recording cues for choosing said portions of said multimedia conference for playback; and
wherein said one or more client devices comprise parties to the multimedia conference and are adapted to set relevance probabilities for recognized recording cues;
wherein the multimedia server is configured to assign an adjustable relevance probability, wherein said adjustable relevance probability can be weighted based on a party's identity.

8. A telecommunications system in accordance with claim 7, wherein said one or more client devices are adapted to adjust relevance probabilities for recognized recording cues during summary viewing after a multimedia conference.

9. A telecommunications system in accordance with claim 7, wherein said one or more client devices are adapted to adjust relevance probabilities for recognized recording cues during said multimedia conference.

10. A telecommunications system in accordance with claim 7, wherein said one or more client devices are adapted to adjust said relevance probabilities and store summaries on a per client basis.

11. A telecommunications system, comprising:
a local area network (LAN);
a multimedia server operably coupled to said network, said multimedia server adapted to manage a multimedia conference and including a memory for storing selectable portions of said multimedia conference;
one or more client devices operably coupled to said LAN and adapted to set recording cues for choosing said portions of said multimedia conference for playback; and
wherein said one or more client devices are adapted to set relevance probabilities for recognized recording cues;
wherein said multimedia server is adapted to average relevance probability scores set by multiple users.

12. A telecommunications system in accordance with claim 11, wherein said one or more client devices are adapted to adjust relevance probabilities for recognized recording cues during summary viewing after a multimedia conference.

13. A telecommunications system in accordance with claim 11, wherein said one or more client devices are adapted to adjust relevance probabilities for recognized recording cues during said multimedia conference.

14. A telecommunications server, comprising:
a multimedia communication controller for interfacing multimedia conferences; and
a collaboration controller operably coupled to said multimedia communication controller, said collaboration controller adapted to store a multimedia conference and play back selected portions of said multimedia conference according to user selected criteria based on recording cues;
wherein said collaboration controller is adapted to play back said portions based on a weighting of user-adjustable relevance probabilities of said recording cues, said users comprising parties to the conference;
wherein said collaboration controller is configured to save conference summary portions based on an average of relevance probabilities.

15. A telecommunications sewer in accordance with claim 14, said collaboration controller adapted to receive adjustment commands from users during a playback of a summary after a conference.

16. A telecommunications server in accordance with claim 14, wherein said collaboration controller is adapted receive relevance probabilities during said conference.

17. A telecommunications server in accordance with claim 16, wherein said collaboration controller is adapted to save conference summary portions on a per user basis.

18. A telecommunications server in accordance with claim 17, wherein said collaboration controller is adapted to save a master summary in addition to per user summaries.

19. A telecommunications server, comprising:
a multimedia communication controller for interfacing multimedia conferences; and
a collaboration controller operably coupled to said multimedia communication controller, said collaboration controller adapted to store a multimedia conference and play back selected portions of said multimedia conference according to user selected criteria based on recording cues;
wherein said collaboration controller is adapted to play back said portions based on user-adjustable relevance probabilities of said recording cues;
wherein said collaboration controller is adapted receive relevance probabilities during said conference;
wherein said collaboration controller is adapted to save conference summary portions based on an average of relevance probabilities.

20. A telecommunications device, comprising an interaction center adapted to conduct a multimedia conference including instant messaging and adapted to allow defining recording cues for playing back portions of said multimedia conference, said interaction center further adapted to specify a playback content by selecting a user-adjustable recording cue relevance probability settable by a party to the conference and weighted according to party identity.

21. A telecommunications device in accordance with claim 20, wherein said relevance probability is adjustable during said multimedia conference.

22. A telecommunications device in accordance with claim 21, wherein said relevance probability is adjustable after said multimedia conference.

23. A telecommunications method, comprising:
storing a plurality of recording cues, said recording cues adapted for marking a predetermined time period around which a portion of a multimedia conference is to be recorded;
capturing sequentially portions of said multimedia conference responsive to execution of said plurality of recording cues; and
assigning an adjustable relevance probability when said capturing occurs;

wherein said assigning comprises one or more users adjusting a probability in real-time during said multimedia conference;

wherein said assigning comprises averaging a probability score set by one or more parties according to a weighting based on an identity of a user.

24. A telecommunications system, comprising:

a local area network (LAN);

a multimedia server operably coupled to said network, said multimedia server adapted to manage a multimedia conference and including a memory for storing selectable portions of said multimedia conference;

one or more client devices operably coupled to said LAN and adapted to set recording cues for choosing said portions of said multimedia conference for playback; and wherein said one or more client devices are adapted to set relevance probabilities for recognized recording cues;

wherein said multimedia server is adapted to average relevance probability scores set by multiple users according to a weighting based on a user identity.

25. A telecommunications server, comprising:

a multimedia communication controller for interfacing multimedia conferences; and a collaboration controller operably coupled to said multimedia communication controller, said collaboration controller adapted to store a multimedia conference and play back selected portions of said multimedia conference according to user selected criteria based on recording cues;

wherein said collaboration controller is adapted to play back said portions based on user-adjustable relevance probabilities of said recording cues;

wherein said collaboration controller is adapted receive relevance probabilities during said conference;

wherein said collaboration controller is adapted to save conference summary portions based on a weighted average of relevance probabilities.

26. A telecommunications method, comprising:

storing a plurality of recording cues, said recording cues adapted for marking a predetermined time period around which a portion of a multimedia conference is to be recorded;

capturing sequentially portions of said multimedia conference responsive to execution of said plurality of recording cues; and assigning an adjustable relevance probability when said capturing occurs, wherein said adjustable relevance probability can be weighted based on a conference participant's identity.

* * * * *